United States Patent
Coronelli et al.

[15] 3,683,074

[45] Aug. 8, 1972

[54] ANTIBIOTIC SELENOMYCIN

[72] Inventors: Carolina Coronelli, 4, Piazza Novelli, Milan; Josef Thiemann, 14 V. le Vittorio Veneto, Appiano Gentile, Come, both of Italy

[22] Filed: June 10, 1970

[21] Appl. No.: 45,227

[52] U.S. Cl. .................................. 424/119, 195/80
[51] Int. Cl. ............................................. A61k 21/00
[58] Field of Search ..................... 424/119; 195/80

[56] References Cited

UNITED STATES PATENTS 3,467,751  9/1969  Bromer et al. ............. 424/119

3,551,561  12/1970  Asza Los et al. .......... 424/119

*Primary Examiner*—Jerome D. Goldberg
*Attorney*—Griswold & Burdick, Kenneth C. Jork and Maynard R. Johnson

[57] ABSTRACT

An antibiotic substance, selenomycin, is produced by cultivation of *Streptosporangium brasiliense* n. sp. ATCC 21,393 and can be isolated from the fermentation medium by extraction. The antibiotic is active against various Gram positive bacteria.

4 Claims, 2 Drawing Figures

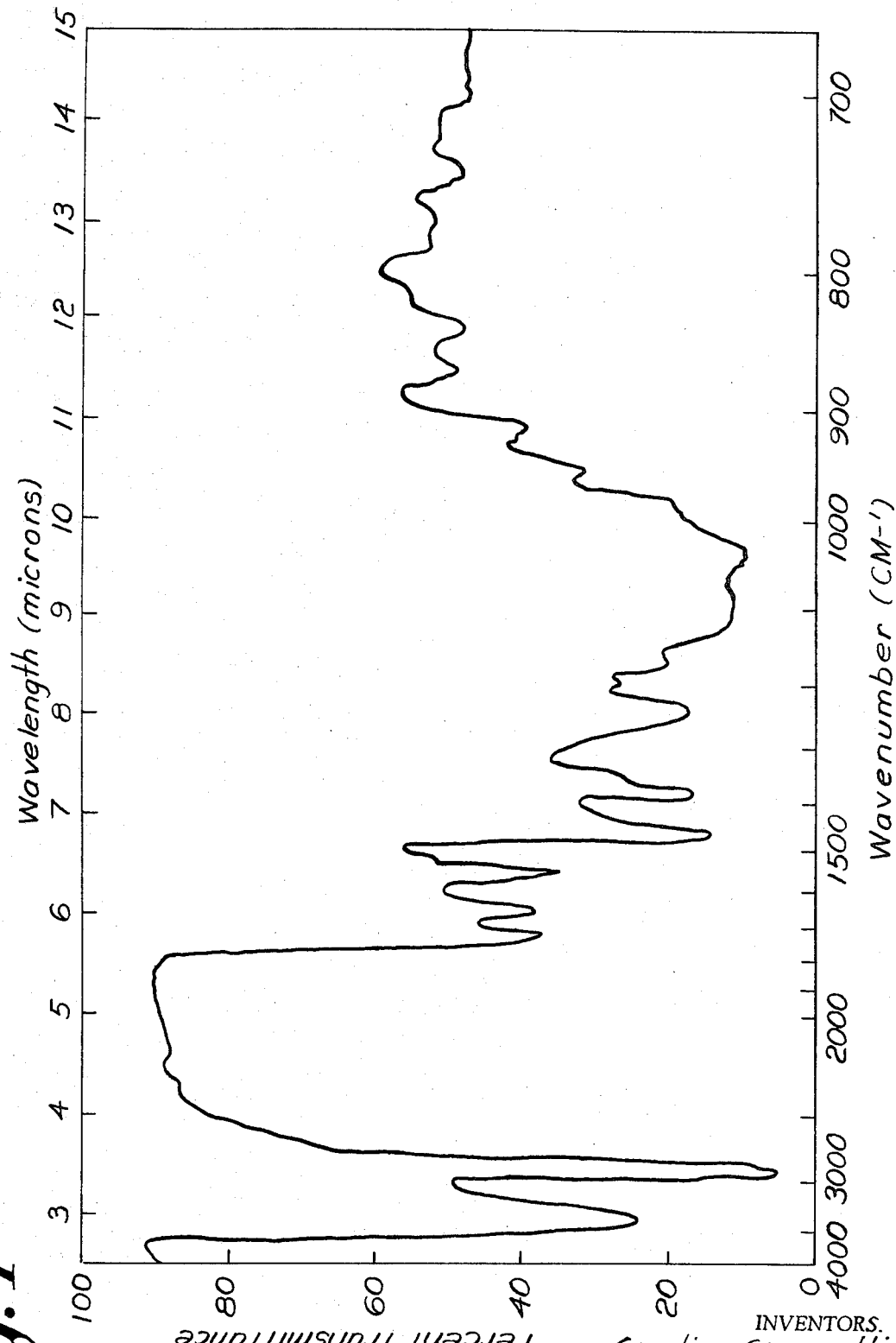

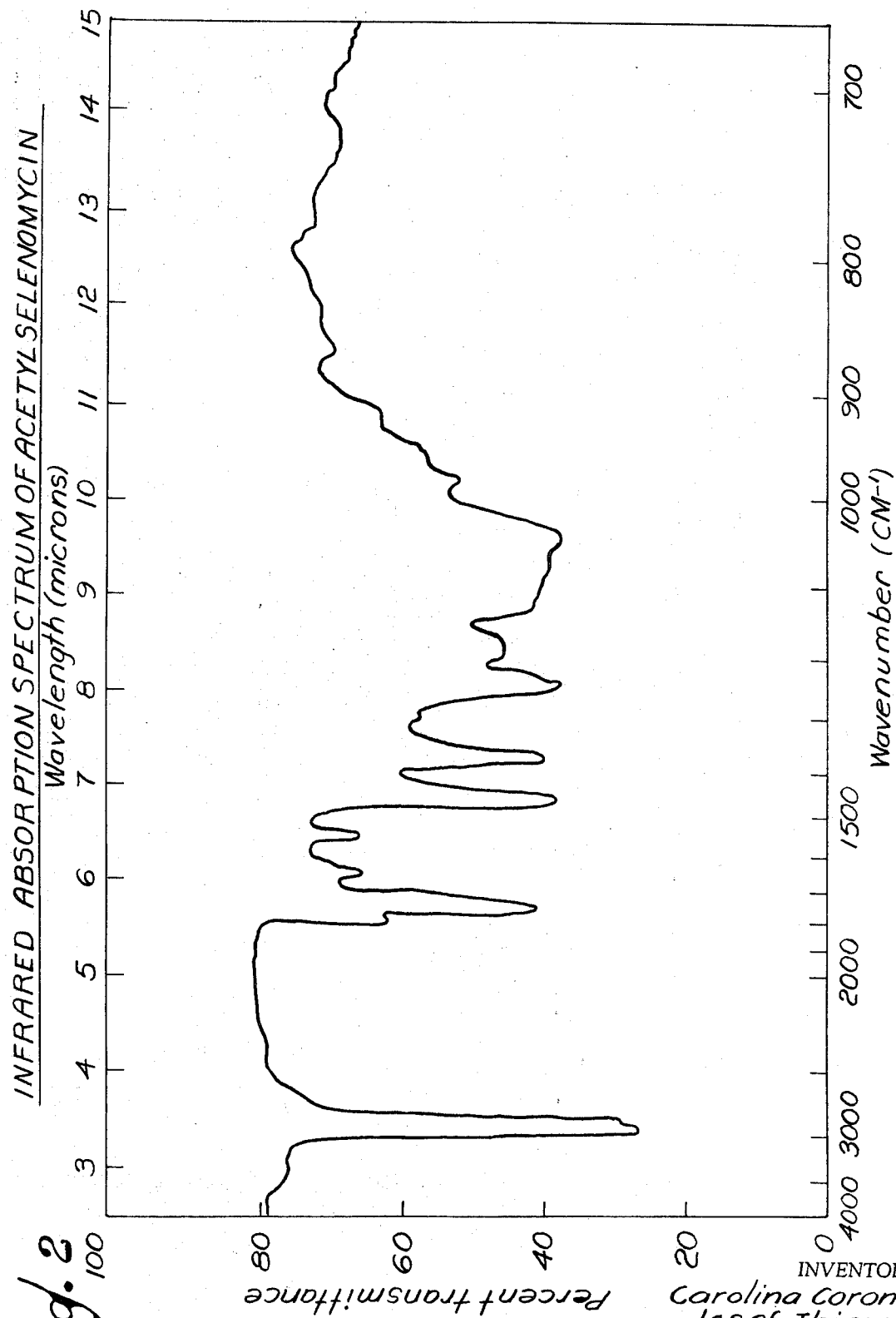

ANTIBIOTIC SELENOMYCIN

BRIEF SUMMARY OF THE INVENTION

This invention is directed to a novel antibiotic substance and is particularly directed to an antibiotic substance, hereinafter referred to as "selenomycin," and is inclusive of a method for preparing the same. The antibiotic substance selenomycin is a solid having characteristic properties such as infrared absorption spectra, melting points, and the like, and forming an acetyl derivative, hereinafter referred to as "acetylselenomycin," as set out in greater detail below.

Selenomycin can be prepared by cultivation of *Streptosporangium brasiliense* n. sp. in an aqueous medium and can be isolated from the medium by conventional procedures. Acetylselenomycin can be prepared by acetylation of selenomycin by conventional procedures, such as the reaction of selenomycin with acetic anhydride in a pyridine reaction medium. In the preparation of selenomycin, the organism *Streptosporangium brasiliense* n. sp. is cultivated under aerobic conditions in an aqueous nutrient medium suitable for the growth of said organism, the medium containing a source of carbon, a source of nitrogen and inorganic salts. Cultivation is continued under conditions conducive to the growth of said organism for a time sufficient for the production of selenomycin, as indicated, for example by substantial antibiotic activity of the fermentation medium against Gram positive bacteria. Selenomycin thus produced can be isolated by conventional procedures such as removal of mycelium by centrifugation followed by extraction, typically with an organic liquid in which selenomycin is soluble and which is immiscible with the aqueous medium.

The antibiotic substance of the invention is useful as an antibiotic, particularly against Gram positive bacteria. Thus selenomycin can be employed in controlling such microorganisms in conventional procedures, such as by application of an antimicrobial amount of selenomycin or a composition containing the same to Gram positive bacteria, or to substrates susceptible to attack by such organisms. In addition, antimicrobial amounts of the antibiotic substance of the invention can be administered to animals by conventional procedures in combatting Gram positive bacteria attacking said animals. Selenomycin can, for example, be employed prophylactically, by internal administration to mammals susceptible to infection by Gram positive bacteria, or therapeutically, by internal administration to infected animals.

BRIEF DESCRIPTION OF THE DRAWINGS

The accompanying drawings illustrate features of the invention as follows:

FIG. 1 illustrates the infrared absorption spectrum of selenomycin; and

FIG. 2 illustrates the infrared absorption spectrum of acetylselenomycin.

DETAILED DESCRIPTION OF THE INVENTION

1. Description of Streptosporangium brasiliense

Most of the antibiotics so far described have been produced by the genera Streptomyces, Micromonospora and Nocardia. During the study for the isolation of new antibiotics from the genus Streptosporangium, a new microorganism has been isolated from a soil sample received from Brazil, producing an antibiotic complex active in vitro and in vivo against several Gram positive bacteria. From the complex many fractions have been isolated, of which one has been found to possess practically the whole of the activity, and which has been named selenomycin. The new microorganism has been given the name *Streptosporangium brasiliense* n. sp. and has been deposited with the American Type Culture Collection under the Ser. No. 21,393.

To investigate the growth characteristics of *Streptosporangium brasiliense*, the culture was grown on a variety of culture media, incubated at 28°–29° C for up to three weeks, when the final cultural examinations were made. Most of the procedures used in the taxonomic study were those recommended by Shirling and Gottlieb.

General characteristics: The culture grows most abundantly on oatmeal agar. On this medium, individual colonies attain a diameter of 5 to 6 millimeters and are covered with abundant white aerial mycelium, which, when sporangia formation is completed, assumes a light rose color.

Iodinin like crystals, common to some Streptosporangium species described, are not formed by this culture. On some culture media, mainly on soil agar, incomplete sporangia are formed in which more or less tightly coiled spirals are devoid of a sporangial wall.

Optimum temperature for development was found to be 28°–32° C.

Morphology of the aerial mycelium: Microscopic examination of the aerial mycelium revealed it to be formed of short highly branched hyphae, on the tip of which a spherical sporangium develops. The average diameter of the aerial mycelium is 0.9 – 1.0 microns. The sporangia are quite variable in size, generally from 3.5 to 11 microns in diameter, however, in fully matured cultures the average diameter is 12 microns. The sporangiophore is rather short, 6 to 24 microns, with an average length of 15 microns and a diameter equal to that of the aerial mycelium. The sporangiophores are disposed in a regular coiled fashion in the interior of the sporangium. Most of the sporangiophores are cylindrical, always non-motile, measuring 2.3 to 2.8 microns by 1.1 microns, but occasionally spherical ones with an average diameter of 1.1 microns are also found. Arthrospore-like spores are formed, however, on the coiled hypha which are not enveloped by a visible sporangial wall, a situation occurring rather frequently on certain poor media such as soil agar. These fragmentation spores normally measure 3.2 to 3.5 microns by 1.0 micron.

Cultural and Physiological Characteristics: The cultural and physiological characteristics of the strain are listed respectively in Tables 1, 2 and 3.

On most media, the vegetative mycelium was of a light cream color, with white aerial mycelium which became very light rose colored where intense formation of sporangia had occurred.

Analysis performed on the purified cell-wall of the new strain showed it to be of the "type 11" of Lechevalier.

Judging from all the mentioned characteristics it must be concluded that the new strain belongs to the genus Streptosporangium since, according to the key to the genera of the Family Actinoplanaceae the sporangiospores are non-motile.

TABLE 1

Cultural Characteristics of Streptosporangium brasiliense n. sp. (G: growth; AM: aerial mycelium; SP: soluble pigment).

| Medium | | |
|---|---|---|
| Medium n. 2 (Shirling and Gottlieb) | G: | Good, with wrinkled surface; cream to light yellow |
| | AM: | Powdery, white, rose colored zones at the colony margin |
| | SP: | None |
| Oatmeal agar (Medium n. 3, Shirling and Gottlieb) | G: | Good, smooth surface, hyaline to cream |
| | AM: | Abundant, powdery, white |
| | SP: | None |
| Starch-agar (Medium n. 4; Shirling and Gottlieb) | G: | Poor, smooth and thin, hyaline |
| | AM: | Traces, white |
| | SP: | None |
| Glycerol asparagine agar (Medium n. 5; Shirling and Gottlieb) | G: | Moderate, smooth surface, hyaline |
| | AM: | White |
| | SP: | None |
| Peptone-yeast extract-iron agar (Medium n. 6; Shirling and Gottlieb) | G: | Good, smooth; light yellow |
| | AM: | None |
| | SP: | None |
| Tyrosine agar (Medium n. 7; Shirling and Gottlieb) | G: | Moderate, smooth and thin, hyaline |
| | AM: | White |
| | SP: | None |
| Glucose asparagine agar | G: | Moderate, smooth, hyaline |
| | AM: | Traces, white |
| | SP: | None |
| Nutrient agar | G: | Good, slightly wrinkled, cream color |
| | AM: | None |
| | SP: | None |
| Potato agar | G: | Good, smooth, cream color to light yellow |
| | AM: | Light rose color |
| | SP: | None |
| Xantine agar | G: | Moderate, smooth and flat, hyaline |
| | AM: | White |
| | SP: | None |
| Calcium malate agar | G: | Moderate, smooth and flat, hyaline |
| | AM: | White |
| | SP: | None |
| Skim milk | G: | Good, smooth, cream color to light yellow |
| | AM: | Traces, white |
| | SP: | None |
| Hickey and Tresner's agar | G: | Good, wrinkled, cream to amber color |
| | AM: | White |
| | SP: | None |
| Bennett agar | G: | Good, wrinkled, cream to light yellow |
| | AM: | White |
| | SP: | None |

TABLE 2

Physiological properties of Streptosporangium brasiliense

| Tests | Results |
|---|---|
| Solubilization of the calcium malate | Negative |
| Nitrate reduction | Positive |
| Tyrosinase production | Negative |
| Melanine formation | Negative |
| Hydrolysis of starch | Positive |
| $H_2S$ formation | Positive |
| Liquefaction of gelatine | Positive |
| Litmus milk | Not coagulated, peptonization |
| Casein hydrolysis | Positive |

TABLE 3

Utilization of carbon sources

| Carbon source | Response |
|---|---|
| Inositol | + |
| Fructose | + |
| Rhamnose | ++ |
| Mannitol | — |
| Xylose | ++ |
| Raffinose | — |
| Arabinose | — |
| Cellulose | — |
| Sucrose | + |
| Glucose (positive control) | ++ |
| No carbon (negative control) | — |

++ : Strongly positive utilization. Growth is similar to or greater than growth on positive control.

+ : Positive utilization. Growth is significantly greater than "no carbon control" although somewhat less than on glucose.

— : Utilization negative. Growth is similar to "no carbon control".

TABLE 4

[Comparison to other species: Comparison of characteristics of members of the genus Streptosporangium is set out below in Table 4.]

| Species | Size of sporangia, μ | Length of sporangiophore, μ | Width of aerial mycelium, μ | Shape and size of spores, μ | Color of aerial mycelium | Starch hydrolysis | Gelatin liquefaction | Nitrate reduction | $H_2S$ formed | Remarks |
|---|---|---|---|---|---|---|---|---|---|---|
| S. album | 6–8 | N.D. | 0.7–1.0 | 1.0–1.3×1.5–1.9 | White | — | + | — | N.D. | |
| S. amethystogenes | 6–8 | N.D. | 0.7–1.0 | 1.0–1.3×1.5–1.9 | Pale pink | + | + | + | N.D. | Violet crystals formed on oatmeal agar. |
| S. roseum | 5–9 | N.D. | 0.7–1.0 | [1] 1.0–1.3×1.5–1.9 | Pale pink | + | + | + | N.D. | |
| S. rubrum | 7.7–11.0 | 1.6–27.0 | 0.8 | [1] 1.0–1.1 | Dark gray | | | | N.D. | |
| S. viridialbum | 6–8 | N.D. | 0.7–1.0 | 1.0–1.3×1.5–1.9 | Grayish white or yellowish gray | + | + | — | N.D. | |
| S. vulgare | 6–8 | N.D. | 0.7–1.0 | 1.0–1.3×1.5–1.9 | Pale pink | + | + | — | N.D. | |
| S. viridogriseum | 20–48 ([2] 29) | 25–64 ([2] 38) | 0.4–0.6 | [1] 0.2–0.4 | Light greenish gray. | + | + | + | N.D. | |
| S. brasiliense | 3.5–14.0 ([2] 12.0) | 6–24 ([2] 15.0) | 0.9–1.0 | [3] 2.3–2.8×1.1 | White | + | + | + | + | |

[1] Spherical. [2] Average. [3] Cylindrical. NOTE.—N.D.=Not determined.

From the comparative data shown in Table 4 it can be seen that the strain differs from any of the other Streptosporangium species so far described. This culture is therefore a new species for which the same *Streptosporangium brasiliense* n. sp., after the place of its isolation, is proposed.

2. Preparation of Selenomycin

Production of selenomycin: For producing the antibiotic selenomycin the strain *Streptosporangium brasiliense* is aerobically cultivated in a nutrient medium until substantial antibiotic activity is present in the medium. Selenomycin is then isolated from the medium. The nutrient medium employed is an aqueous medium containing inorganic salts, a source of carbon and of nitrogen and, if desired, growth promoting substances.

The inorganic salts employed can be, for example, alkali metal and alkaline earth metal chlorides, nitrates, carbonates, sulfates, or the salts of magnesium, iron, manganese, zinc, etc., with the same anions. The sources of nitrogen and carbon can be, for instance, natural or synthetic aminoacids, peptides and proteins and their hydrolysates, such as peptone or tryptone; meat extract; the water soluble constituents of cereal grains, such as maize or wheat; distiller's solubles, yeast extract, corn steep liquor, etc., glucose, sucrose, lactose, starch, dextrins and the like.

Cultivation is carried out under aerobic conditions, in a submerged culture, while agitating with air or oxygen at a temperature between about 25° to about 35° C., and is generally carried out for about 24 to about 96 hours.

Isolation of selenomycin: The strain grown in submerged culture produces a group of active substances. The following recovery procedure can be used to obtain selenomycin.

Selenomycin is produced in good yields and the activity can be extracted from the fermentation broths with an organic solvent, preferably, butanol, ethyl acetate or chloroform, the extraction being carried out with adjustment of the broth to a slightly acidic pH. Selenomycin is somewhat unstable under acidic conditions (acid pH); thus, the pH for extraction should be carefully controlled and should not be lower than 5.0.

In a preferred procedure, the fermentation broth is filtered at alkaline pH in order to avoid retention of some microbiological activity in the mycelial filter cake; the filtrate is acidified to pH 5.5 and extracted twice with chloroform; the combined extracts are concentrated to a small volume under reduced pressure and selenomycin is obtained by addition of a large volume of light petroleum to the concentrated extracts to precipitate the product. The product thus obtained can be purified by treatment at 35° C with a mixture containing 30 percent chloroform and 70 percent benzene. The insoluble fraction is filtered off and the solution, concentrated to a small volume, is added to a large volume of hexane to precipitate the product. The product thus obtained is dissolved in hot benzene, decolorized with charcoal, filtered and cooled at 4° C. The antibiotic is obtained as a white amorphous powder which melts at 135°–138° C.

3. Properties of Selenomycin

Properties of selenomycin — The antibiotic is soluble in alcohols, chloroform, ethyl acetate, acetone, dioxane and hot benzene; insoluble in water at neutral and acidic pH, soluble in alkaline water, insoluble in diethyl ether.

The ultraviolet absorption spectrum shows the following maxima: in HCl 0.1N shoulder at 245–257 m$\mu$ ($E_{1\,cm}^{1\%}=41$), in buffer solution pH 7.3 295 m$\mu$ ($E_{1\,cm}^{1\%}=88$) in NaOH 0.1N 295 m$\mu$ ($E_{1\,cm}^{1\%}=88$).

The presence of a function with pKa 5.5 has been revealed by means of spectrophotometric titration.

The infrared absorption spectrum of selenomycin in nujol mull shows absorptions at the following frequencies: 3,400, 1,720, 1,650, 1,550, 1,520, 1,350 (sh), 1,240, 1,200, 1,170, 1,100, 1,040, 980, 950, 912, 870, 835, 815, 785, 770, 740, 720 cm$^{-1}$. The infrared absorption spectrum of selenomycin is represented in FIG. 1.

Selenomycin gives positive Tollens and Fehling reactions, negative Shiff, FeCl$_3$ and Molish reactions; it rapidly decolorizes potassium permanganate in both acidic and neutral solutions, gives a phenylhydrazone with 2,4-dinitro-phenylhydrazine, a brown color with concentrated sulfuric acid and concentrated hydrochloric acid.

The paper chromatographic behavior of selenomycin with different solvent systems is summarized in the following Table 5:

TABLE 5

Paper Chromatographic Behavior of Selenomycin

| Solvent mixture | Rf value |
|---|---|
| 1) Water saturated butanol | 0.84 |
| 2) Water saturated butanol + 2% para-toluenesulfonic acid | 0.95 |
| 3) Water saturated butanol + 2% NH$_4$OH | 0.69 |
| 4) Butanol saturated water | 0.78 |
| 5) NH$_4$Cl 20% aqueous solution | 0.00 |
| 6) Phenol 75% — water 25% | 0.96 |
| 7) Butanol: methanol: water 4:1:2 + 0.75 g methyl orange | 0.82 |
| 8) Butanol: methanol: water 4:1:2 | 0.92 |
| 9) Acetone: water 1:1 | 0.34 |
| 10) Water saturated ethyl acetate | 0.79 |

The antibiotic is visualized on paper strips by microbiological development on agar plates seeded with *B. subtilis*.

Selenomycin gives an acetyl derivative acetylselenomycin by acetylation of selenomycin with acetic anhydride in pyridine. The derivative can be obtained in a pure form by crystallization from methanol. The analytical data for the acetyl derivative are as follows:

C = 55.5% H = 5.86% O = 38.8% COCH$_3$ = 21%

It melts at 152°–154° C. The specific rotation is $\alpha_D^{22}$ — 34° (C = 0.3 percent in methanol). The ultraviolet absorption spectrum shows maxima at 294 m$\mu$ ($E_{1\,cm}^{1\%}=60$) in NaOH 0.1N and shoulder at 250–270 m$\mu$ in HCl 0.1N and in buffer solution pH 7.3.

The infrared absorption spectrum in nujol mull shows absorption at the following frequencies: 1,790, 1,750, 1,720 (sh), 1,640, 1,550, 1,240, 1,195, 1,130–1,040, 980, 958, 920, 865, 780, 750–720 cm$^{-1}$. The infrared absorption spectrum of acetylselenomycin is represented in FIG. 2. Selenomycin is stable in neutral and alkaline solution but unstable in acid solution; aqueous solutions of the antibiotic at pH 3.0 lose 80 percent of the activity after 24 hours.

Selenomycin shows activity against various Gram positive bacteria while it is much less active against Gram negative bacteria, yeasts and fungi. The minimal inhibitory concentrations against various microorganisms are reported in the following table 6:

TABLE 6

Antimicrobial Activity of Selenomycin

| Organism | Minimal Inhibitory Concentrations in Micrograms per Milliliter |
|---|---|
| Staphylococcus aureus ATCC 6538 | 0.2 |
| Staphylococcus aureus Tour | 2.0 |
| Staphylococcus aureus ATCC 9144 | 0.5 |
| Staphylococcus albus ATCC 12228 | 2.0 |
| Streptococcus faecalis ATCC 10541 | 2.0 |
| Streptococcus faecalis ATCC 7080 | 5.0 |
| Streptococcus hemolyticus C 203 | 0.1 |
| Streptococcus agalactiae ATCC 7077 | 0.2 |
| Streptococcus bovis ATCC 9809 | 1.0 |
| Diplococcus pneumoniae UC 41 | 0.5 |
| Sarcina lutea ATCC 9341 | 0.5 |
| Micrococcus flavus ATCC 10240 | 0.5 |
| Bacillus subtilis ATCC 6633 | 0.5 |
| Bacillus cereus ATCC 10876 | 0.5 |
| Bacillus anthracis M 401 | 0.5 |
| Clostridium perfringens ATCC 3626 | 0.5 |
| Corynebacterium diphtheriae mitis ATCC 11051 | 0.2 |
| Proteus vulgaris | >100 |
| Escherichia coli ATCC 10536 | >100 |
| Pseudomonas aeruginosa ATCC 10145 | >100 |
| Candida albicans SKF 10231 | >100 |
| Trichophyton mentagrophytes SKF 8757 | >100 |
| Mycobacterium tuberculosis H37Rv ATCC 9360 | >100 |

Selenomycin shows an interesting activity in controlling infections due to Staphylococcus, Streptococcus, Diplococcus and in general to Gram positive bacteria in animals. The following $ED_{50}$ values have been obtained on mice treated subcutaneously for three days with the antibiotic after having been infected with the following strains:

| | | |
|---|---|---|
| S. aureus | $ED_{50} \approx$ | 30 mg/Kg |
| S. hemolyticus | $ED_{50} \approx$ | 20 mg/Kg |
| D. pneumoniae | $ED_{50} \approx$ | 15 mg/Kg |

The $LD_{50}$ in mice is 400 mg/Kg by intraperitoneal route. Useful therapeutic levels are reached by administration of 50 mg/Kg of selenomycin to mice by subcutaneous, rectal and intraperitoneal route. The blood levels are given in the following table 7:

TABLE 7

Blood level of selenomycin in micrograms per milliliter after administration of 50 mg/Kg to mice.

| Hours after administration | Route subcutaneous | rectal | intraperitoneal |
|---|---|---|---|
| 1 | 27 | 4.92 | 37.20 |
| 3 | 25 | 6.10 | 23.70 |
| 5 | 18 | 3.10 | 21.25 |

DESCRIPTION OF PREFERRED EMBODIMENTS

The following examples are illustrative of the invention but are not to be construed as limiting the same.

EXAMPLE 1

A. Shake Flask Fermentations

I. Inoculum preparation

Oatmeal agar slants seeded with *Streptosporangium brasiliense* are incubated at 32° C for 7 to 10 days and then used to inoculate 100 milliliters of a peptone-glucose-yeast extract medium contained in a 500 milliliter Erlenmeyer flask having a single lateral baffle.

The composition of this germination medium is the following:

| | |
|---|---|
| Peptone | 5.0 grams |
| Meat extract | 5.0 grams |
| NaCl | 5.0 grams |
| Yeast extract | 1.0 grams |
| Glucose | 10.0 grams |
| Tap water q.s. to | 1 liter |

The medium is adjusted to pH 7.2 and sterilized for 20 minutes at 121° C. The germination flasks are incubated at 28° C for 72 hours on a rotary shaker having a 2 inch throw and operating at 240 rpm. After the aforementioned incubation time the pH of the medium is 8.5 and the percent mycelium volume (pmv) is 12. The percent mycelium volume is determined by centrifuging a 10 milliliter sample for 10 minutes at 3,000 rpm.

II. Fermentation conditions

A 10 percent transfer is made from the germination flask to 500 milliliter Erlenmeyer flasks provided with one lateral baffle, and containing 100 milliliters of medium of the following composition:

| | |
|---|---|
| Meat extract | 4.0 grams |
| Peptone | 4.0 grams |
| NaCl | 2.5 grams |
| Yeast extract | 1.0 grams |
| Soybean meal | 10.0 grams |
| Glucose | 50.0 grams |
| $CaCO_3$ | 5.0 grams |
| Tap water q.s. to | 1 liter |

The pH of the medium is adjusted to 7.3 and the medium is sterilized for 20 minutes at 121° C. The fermentation flasks are inoculated and are incubated and agitated under the same conditions used of the germination flasks as already described. After 72 hours of fermentation, the mycelium is separated by centrifugation and the clear supernatant broth is assayed by streak dilution methods using Bacillus subtilis and Staphylococcus aureus as indicator cultures. The results are as follows:

| Microorganisms | Antibiotic activity in dilution units (72 hours fermentation.) |
|---|---|
| Bacillus subtilis | 1/2560 |
| Staphylococcus aureus | 1/320 |

EXAMPLE 2

An inoculum is prepared and grown as in Example 1 employing a fermentation medium similar to that described above in Example 1 modified by substituting various other carbohydrates for glucose. Aliquots of the fermentation broth are assayed for antibiotic activity, using *B. subtilis* as indicator strain, after 72 and 96 hours of fermentation. The results are as follows:

| Culture medium of Example 1 with | Inhibition zones (in millimeters) of B. subtilis, using standard 9 mm diameter filter paper discs. | |
|---|---|---|
| | 72 hours | 96 hours |
| Glucose (control) | 18 | 16 |

| | | |
|---|---|---|
| Xylose | 22 | 20 |
| Galactose | 12 | 12 |

EXAMPLE 3

Jar fermentation

I. Inoculum preparation a. First vegetative stage

Inoculum source: Slant culture of *Streptosporangium Brasiliense* grown on oatmeal agar. A medium and conditions of growth identical to those already described in Example 1 are employed.

b. Second vegetative stage

Inoculum source: 2.5 percent (25 milliliters) of the first vegetative stage. The medium used for the second vegetative stage is the same as the medium employed in the first stage. The medium, 4 liters is a 10 liter glass fermentor, is adjusted to pH 7.2–7.3, sterilized for 30 minutes at 121° C, inoculated and incubated at 28° C for 72 hours.

During the incubation the broth is aerated at the rate of one liter of air per liter of broth per minute and stirred at 800 rpm. At the end of the growth period the pH is 8.5 and a percent mycelium volume of 12 percent is obtained.

II. Fermentation conditions

Inoculum sources: 300 milliliters (7.5 percent) of the second vegetative stage. The medium employed is the same as described in Example 1 adjusted to pH 7.2 – 7.3 and sterilized for 30 minutes at 121° C. The inoculated medium is incubated under the same conditions used for the development of the second vegetative stage. Maximum antibiotic titers are usually obtained after 72 hours of fermentation.

EXAMPLE 4

Extraction of Selenomycin from Fermentation Media

Forty liters of culture broth are filtered at pH 8.5 and the mycelial cake is discarded. The pH of the culture filtrate is lowered to 5.5 by addition of normal aqueous hydrochloric acid. Sodium chloride is added to a concentration of 20 percent (w/v). The filtrate is extracted twice with chloroform, a volume of chloroform equal to one-half the filtrate volume being employed for each extraction, and the chloroform extracts are combined. The combined chloroform extracts are dried over sodium sulfate, and concentrated to a volume of 50 milliliters in vacuo at 30° C. The antibiotic is precipitated from the concentrated extract by the addition of 2 liters of light petroleum. Four grams of crude antibiotic are obtained. The crude antibiotic is suspended in 200 milliliters of a mixture of 30 percent by volume of chloroform in benzene. The suspension is shaken at a temperature of 35°–40° C., the insoluble fraction is filtered off, the filtrate is concentrated to a volume of 80 milliliters and 500 milliliters of hexane are added. The precipitate is dissolved in 30 milliliters of hot benzene and the hot solution is treated with charcoal, filtered and cooled at 40° C. for 10–12 hours. Eight hundred mg. of white amorphous product are obtained. The product is found to be active against Staphylococcus aureus at a concentration of 0.2 micrograms per milliliter.

EXAMPLE 5

Preparation of Acetylselenomycin 0.800 Grams of selenomycin are mixed with 20 milliliters of pyridine, and 20 grams of acetic anhydride are added to the mixture. The mixture is held at a temperature of 20°–25° C. for 24 hours after which the product is separated by pouring the mixture into ice water. The acetylselenomycin product is purified by chromatography through a silicagel column by eluting with a methanol solution containing 2 percent of chloroform. The compound after recrystallization from methanol is found to melt at 152°–154° C.

What is claimed is:

1. The antibiotic substance, selenomycin, having a melting point of 135°–138° C.; being soluble in lower alkanols, chloroform, ethyl acetate, acetone, dioxane and hot benzene and insoluble in diethyl ether; having an ultraviolet absorption spectrum with the following maxima: in 0.1N HCl, shoulder at 245–257 m$\mu$ ($E_{1\,cm}^{1\%}$ = 41), in pH 7.3 buffer solution, 295 m$\mu$ ($E_{1\,cm}^{1\%}$ = 88), in 0.1N NaOH, 295 m$\mu$ ($E_{1\,cm}^{1\%}$ = 88); having an acid group with pKa 5.5; having an infrared absorption spectrum in nujol with maxima at the following wave-lengths expressed in cm$^{-1}$: 3,400, 1,740, 1,650, 1,570, 1,550, 1,350, 1,245, 1,200, 1,170, 1,100, 1,040, 1,000, 980, 950, 912, 870, 835, 812, 783, 770, 738, 720, 680; giving positive Tollens and Fehling reactions and negative Schiff, ferric chloride and Molisch reactions; decolorizing potassium permanganate in neutral and acid solution; giving a phenylhydrazone with 2,4-dinitrophenylhydrazine; and giving a brown color with concentrated sulfuric acid and concentrated hydrochloric acid; and being further characterized in that said selenomycin is adapted to be acetylated with acetic anhydride in pyridine to produce acetylselenomycin of melting point 152°–154° C.; containing the elements carbon, hydrogen, oxygen in substantially the following proportions by weight: carbon 55.5 percent, hydrogen 4.86 percent and oxygen 38.8 percent; containing the acetyl group in a proportion of about 21 percent; showing specific rotatory power $(\alpha)_D^{22} - 34°$ (C=0.3 percent in methanol); having an ultraviolet absorption spectrum with the following maxima: in 0.1N NaOH, 294 m$\mu$ ($E_{1\,cm}^{1\%}$ = 60), in 0.1N HCl and in pH 7.3 buffer solution, shoulder at 250–270 m$\mu$; having an infrared absorption spectrum in nujol at the following wavelengths expressed in cm$^{-1}$: 3,400, 1,790, 1,745, 1,690–1,640, 1,545, 1,340, 1,240–1,235, 1,195, 1,130, 1,105, 1,080, 1,040, 980, 958, 920–914, 865, 840, 830, 780, 750, 735, 700, 684.

2. A process useful for the manufacture of selenomycin, which comprises cultivating the organism *Streptosporangium brasiliense* ATCC No. 21393 under aerobic conditions in an aqueous nutrient medium containing a source of carbon and of nitrogen and inorganic salts at a temperature between about 25° and about 35° C. for a time sufficient to provide substantial antimicrobial activity in the medium.

3. The process of claim 2 wherein the source of carbon comprises a member of the group consisting of glucose, xylose and galactose.

4. The process of claim 2 further comprising the step of isolating selenomycin from the medium.

* * * * *